(12) United States Patent (10) Patent No.: US 8,171,244 B2
Bondurant et al. (45) Date of Patent: May 1, 2012

(54) METHODS FOR IMPLEMENTATION OF WORM MODE ON A REMOVABLE DISK DRIVE STORAGE SYSTEM

(75) Inventors: Matthew D. Bondurant, Superior, CO (US); Mark Payne, Longmont, CO (US); S. Christopher Alaimo, Boulder, CO (US)

(73) Assignee: Imation Corp., Oakdale, MN (US)

( * ) Notice: Subject to any disclaimer, the term of this patent is extended or adjusted under 35 U.S.C. 154(b) by 550 days.

(21) Appl. No.: 12/024,582

(22) Filed: Feb. 1, 2008

(65) Prior Publication Data

US 2009/0198927 A1 Aug. 6, 2009

(51) Int. Cl.
*G06F 12/16* (2006.01)

(52) U.S. Cl. ............ 711/161; 711/4; 711/111; 711/115; 711/E12.103

(58) Field of Classification Search ........................ None
See application file for complete search history.

(56) References Cited

U.S. PATENT DOCUMENTS

| 5,360,651 A * | 11/1994 | Baxter et al. ................. 428/64.4 |
| 2002/0035665 A1 * | 3/2002 | Basham et al. ............... 711/112 |
| 2004/0133740 A1 * | 7/2004 | Prewitt .......................... 711/112 |
| 2005/0231846 A1 * | 10/2005 | Winarski et al. ................ 360/69 |
| 2007/0219948 A1 * | 9/2007 | Bugovics .......................... 707/2 |
| 2009/0100224 A1 * | 4/2009 | Wang ............................. 711/118 |

* cited by examiner

*Primary Examiner* — Edward Dudek, Jr.
*Assistant Examiner* — Ralph A Verderamo, III
(74) *Attorney, Agent, or Firm* — Dorsey & Whitney LLP

(57) ABSTRACT

Embodiments provide systems and methods for maintaining immutable data in an archiving system using random access memory. To ensure data is immutable, novel pointers are maintained in the hardware/firmware of the drive ports and on the removable disk drives. For example, a hardware/firmware in a modular drive bay maintains a pointer to a memory address in the removable disk drive memory that cannot write to a memory block that precedes the pointer. Data may only be stored after the pointer in the removable disk drive. As such, once data is written to the removable disk drive, the data cannot be overwritten although the removable disk drive employs random access memory.

18 Claims, 10 Drawing Sheets

METHODS FOR IMPLEMENTATION OF WORM MODE ON A REMOVABLE DISK DRIVE STORAGE SYSTEM

BACKGROUND

Embodiments of the disclosure generally relate to storage systems and, more specifically, but not by way of limitation, to archiving storage systems.

Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage.

Further, these organizations often also require the data stored in the archiving system to be immutable. Immutability is a requirement that once the data is written into the archiving system the data cannot be overwritten or deleted. Thus, once data is stored to the archiving system, some type of protection is warranted to ensure the immutability of the data.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
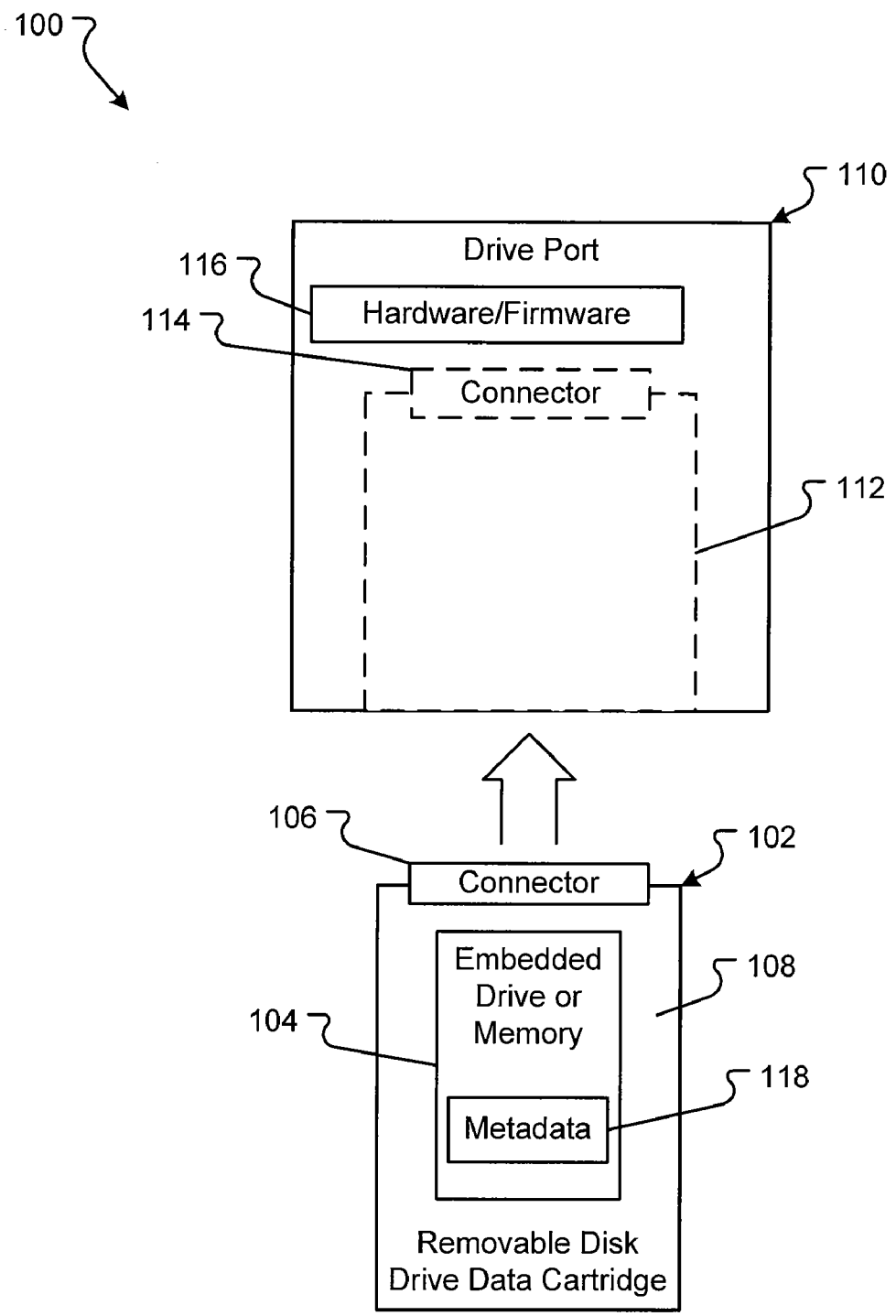
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

SUMMARY

Embodiments of the present disclosure provide unique and novel systems and methods for storing data on removable disk drives. The removable disk drives described herein include random access memory. To ensure data is immutable, novel controls are described that prevent overwriting of immutable data stored in removable disk drives. For example, a hardware/firmware in a modular drive bay maintain a point to a memory address in the removable disk drive memory. Data may only be stored after the pointer in the removable disk drive. Alternative systems and methods are also presented.

DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

An embodiment of a removable disk system 100 to provide long-term archival data storage is shown in FIG. 1. A removable disk drive 102 provides storage capability for the removable disk system 100. In embodiments, the removable disk drive 102 includes a data cartridge case 108 and an embedded memory 104, which may one of, but is not limited to, be an embedded hard disk drive (HDD), solid state disk (SSD), solid state drive, or flash memory. The HDD or flash memory 104 provides RAM for the storage of archived data. The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component and the connector protrudes from the data cartridge case 108. The data cartridge case 108, in embodiments, provides a solid container for the embedded memory 104 that also functions as an easily swappable or changed case when interchanging removable disk drives 102 in the removable disk system 100.

The embedded memory 104, in embodiments, includes metadata 118. Metadata 118, in embodiments, allows the archiving system to provide different functionality with the removable disk drive 102. Metadata 118 can include any information about the data stored in the memory 104. The information can include memory addresses, protection formats for the data, encryption keys, etc. With the metadata 118 stored in the embedded memory 104, the removable disk drive 102 may be stored and allow the removable disk drive 102 to be reinserted with the same functionality.

In embodiments, the removable disk system 100 contains a drive port 110 that includes one or more data cartridge ports 112, each with a data cartridge connector 114 to receive the removable disk drive 102. The data cartridge connector 114 mates with the electrical connector 106 of the removable disk drive 102 to provide an electrical connection to the removable disk drive 102 and/or to communicate with the embedded memory 104 in the removable disk drive 102. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the data cartridge case 108 of the removable disk drive 102 to be easily inserted and removed as necessary. In embodiments, the drive port 110 includes two or more data cartridge ports 112 to allow for the use, control and communication with two or more removable disk drives 102. Each drive port 110, in embodiments, is separately addressable to allow for customized control over each removable disk drive 102 connected to each data cartridge port 112. Thus, as removable disk drives 102 are replaced, the same controls can be applied to the newly inserted removable disk drives 102 because the drive port 110 is addressed instead of the removable disk drives 102.

The embedded memory 104 may be read and used by the hardware/firmware 116 of the drive port 110. The hardware/firmware 116 may be hardware and/or software resident in the drive port 110 for controlling the removable disk drive 102. In embodiments, the hardware/firmware 116 contains the necessary software and/or hardware to power-up the removable disk drive 102, spin-up the disk platters in the embedded memory 104, read and write to the embedded memory 104, read, write and process metadata 118, etc. For example, the hardware/firmware 116 could read the embedded memory 104 to identify the removable disk drive 102 and gather information related to its contents.

In embodiments, the removable disk system 100 operates to receive one or more removable disk drives 102 in the one or more drive ports 110. The electrical connector 106 physically connects or couples with the data cartridge connector 114 to form an electrical connection that allows the drive port 110 to communicate with the embedded memory 104. The hardware/firmware 116 powers-up the embedded memory 104 and begins any initialization processes (e.g., security processes, identification processes, reading and/or writing, etc.). The drive port 110, in embodiments, is in communication with a network, receives archival data from one or more servers, applications, or other devices or systems on the network. The hardware/firmware 116 writes the archival data to the embedded memory 104 of the removable disk drive 102 to archive the data.

Figure 2:
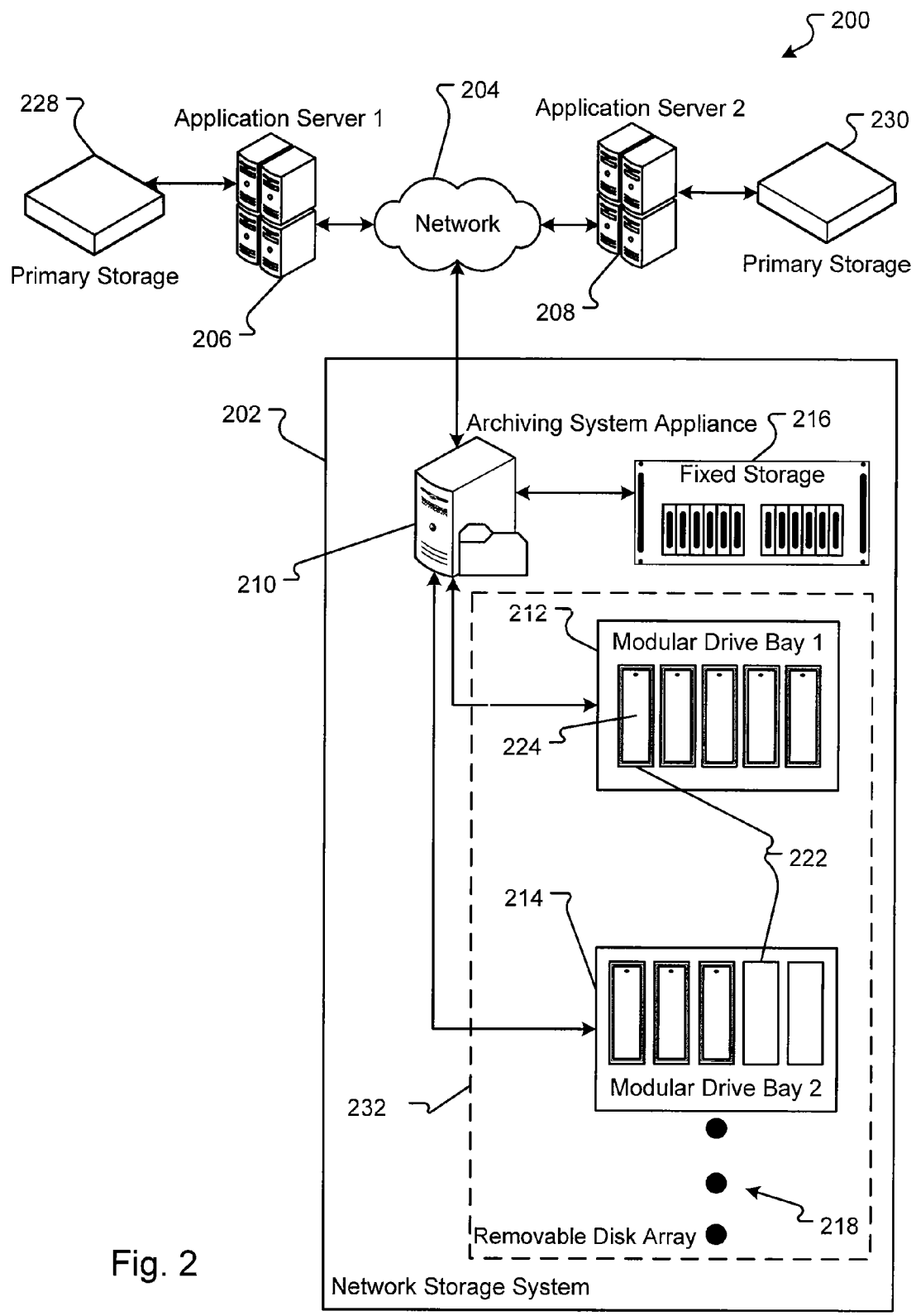
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices, and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes an archiving system appliance 210 and one or more removable disk drives 224, which may be the same or similar to removable disk drive 102 (FIG. 1), connected or in communication with a drive port 222, which may be the same or similar to drive port 110 (FIG. 1). In alternative embodiments, a modular drive bay 212 and/or 214 includes two or more drive ports 222 that can each connect with a removable disk drive 224. Thus, the modular drive bays 212 and 214 provide added storage capacity because more than one removable disk drive 224 can be inserted and accessed using the same archiving system appliance 210. Further, each drive port 222 in the modular drive bays 212 and 214 are, in embodiments, separately addressable allowing the archiving system appliance 210 to configure the removable disk drives 224 in the modular drive bays 212 and 214 into groups of one or more removable disk drives 224. Two or more modular drive bays 212 and 214, in embodiments, are included in the network storage system 202, as evidenced by the ellipses 218. Thus, as more data storage capacity is required, more modular drive bays 212 and 214 may be added to the network storage system 202. In embodiments, each modular drive bay 212 and 214 may include a single hardware/firmware 116 (FIG. 1) for all drive ports 222 in the modular drive bays 212 and 214. In alternative embodiments, each drive port 222 includes hardware/firmware 116 (FIG. 1).

The exemplary hardware architecture in FIG. 2 provides near limitless capacity as more removable disk drives 224 can be added to existing modular drive bays 212 or 214 until the modular drive bays 212 and 214 hold all possible removable disk drives 224. Then, more modular drive bays 212 and 214 are added to the network storage system 202. Further, removable disk drives 224 may be replaced as the removable disk drives 224 near their storage capacity. The removed disk drives 224, in embodiments, are physically stored if and until the data on the removable disk drives 224 needs to be retrieved. If the data on the removable disk drive 224 needs to be retrieved, the removable disk drive 224 may be inserted into one of the drive ports 222 of the modular drive bay 212 or 214, and the information retrieved from the connected removable disk drive 224.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein. Hereinafter, the archiving system appliance 210 may be referred to as the host.

In embodiments, the two or more modular drive bays 212 and/or 214, having each one or more inserted removable disk drives 224, form a removable disk array (RDA) 232. The archiving system appliance 210 can configure the RDA 232 into one or more independent file systems. Each application server 206 or 208 requiring archiving of data may be provided a view of the RDA 232 as one or more independent file systems. In embodiments, the archiving system appliance 210 logically partitions the RDA 232 into application layer partitions and logically associates one or more drive ports 222 with each application layer partition. An application layer partition is associated with the application server 206 or 208 rather than some arbitrary logical divisions. Thus, the one or more removable disk drives 224 comprising the application layer partition appears as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 224. For example, the application server 1 206 stores archival data in a first application layer drive, such as, the first three removable disk drives. The application layer drives are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture. In embodiments, the archival data is also referred to as an information element and may include, but is not limited to, a file, a memory sector, a data structure, a table, or other type or format of data.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 224. If the data is needed in the short term, the archiving system appliance 210 retrieves the data from the fixed storage 216. The archiving system appliance 210, in embodiments, sends the archival data to or removes the archival data from the modular drive bay 212 or 214 having a predetermined address to store or retrieve the archival data from a removable disk drive 224.

The archiving system appliance 210 can also configure the active archive in the fixed storage 216 into one or more independent file systems, as with the RDA 232. As explained above, each application server may be provided a view of one of two or more independent file systems. Each independent file system may comprise an application layer partition in the RDA 232 and a related application layer partition in the fixed storage 216. In embodiments, the archiving system appliance 210 partitions the fixed storage 216 and associates each application layer partition in the fixed storage 216 with an associated application layer partition in the RDA 232.

As explained above, the archiving system appliance 210, in embodiments, determines where and how to store the data to one or more removable disk drives 224. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the related application layer partitions in both the fixed storage 216 and the RDA 232, which may comprise one or more of the removable disk drives 224 in one or more of the drive ports 222. The archiving system appliance 210 can retrieve or receive a memory address(es) for the data to be stored in the removable disk drive 224. The archival data is written to the removable disk drive 224 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 224 and a different portion of the fixed storage 216 because the archival data from application server 2 208 relates to a different application and, thus, a different application layer partition.

Figure 3:
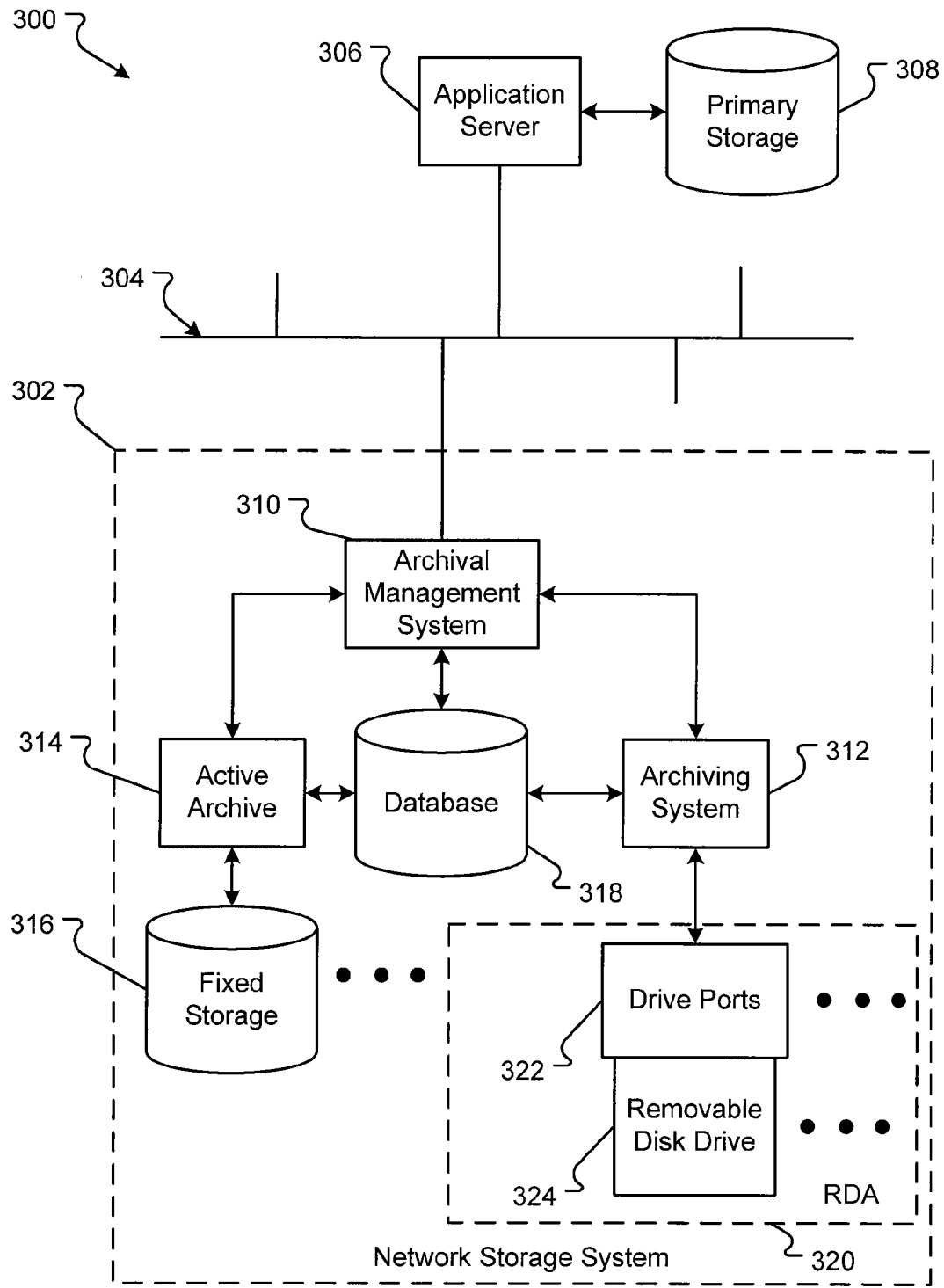
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312 in communication with one or more drive ports 322 that are in communication with one or more removable disk drives 324. The drive ports 322 and removable disk drives 324 are the same or similar in function to those described in conjunction with FIGS. 1 and 2. The archiving system 312 controls the function of the one or more drive ports 322 and writes the archived data to one or more predetermined removable disk drives 324 in the one or more drive ports 322.

In further embodiments, the network storage system 302 comprises an archival management system 310. The archival management system 310 receives data for archiving from one or more systems on the network 304. Further, the archival management system 310 determines to which system or removable disk drive 324 the data should be archived, in which format the data should be saved, and how to provide security for the network storage system 302. In embodiments, the archival management system 310 provides a partitioned archive such that the network storage system 302 appears to be an independent file system to each separate application server 306, yet maintains the archive for multiple application servers 306. Thus, the archival management system 310 manages the network storage system 302 as multiple, independent file systems for one or more application servers 306. In embodiments, the archival management system 310 and the archiving system 312 are functional components of the archiving system appliance 210 (FIG. 2).

In embodiments, the archival management system 310 saves archival data to both the archiving system 312 and an active archive 314. The active archive 314, in embodiments, controls, reads from and writes to one or more fixed storage devices 316 that allow easier access to archived data. In embodiments, fixed storage 316 is similar in function to fixed storage 216 (FIG. 2). The active archive 314 performs similar functions to the archiving system 312 but for the fixed storage devices 316. In embodiments, the active archive 314 and the fixed storage devices 316 are components of the hardware fixed storage system 216 (FIG. 2). In alternative embodiments, the active archive 314 partitions the fixed storage 316 to mirror the associated application layer partitions in the RDA 320. The application layer partition(s) in the active archive 314 may have boundaries associated with memory addresses in the fixed storage 316.

The archival management system 310 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310 can apply controls to different portions of the RDA 320 and the active archive 314 according to user-established data storage requirements. In one embodiment, the archival management system 310 creates application layer partitions in the archive that span one or more removable disk drives 324 and one or more portions of the fixed storage 316. All data to be stored in any one application layer partition can have the same requirements and controls. Thus, requirements for data storage are applied to different drive ports 222 (FIG. 2) in the modular drive bays 212 and 214 (FIG. 2) and to the removable disk drives 224 (FIG. 2) stored in those drive ports 222 (FIG. 2). Further, the requirements are likewise applied to different portions of the fixed storage 316 in the active archive 314. If a removable disk drive is replaced, the same storage requirements, in embodiments, are applied to the replacement removable disk drive 324 because of its location in the controlled drive port. As such, the archival management system 310 can individually maintain separate sets of data using different controls, even in different removable disk drives.

The network storage system 302 may also comprise a database 318 in communication with the archival management system 310. The database 318 is, in embodiments, a memory for storing information related to the data being archived. The database 318 may include HDDs, ROM, RAM or other memory either internal to the network storage system 302 and/or the archival management system 310 or separate from the network storage system 302 and/or archival management system 310 as a discrete component addressable by the archival management system 310. The information stored in the database 318, in embodiments, includes one or more of, but is not limited to, data identification, application server identification, time of storage, removable disk drive identification, data format, encryption keys, application layer partition organization, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, an HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310. The archival management system 310, in embodiments, sends the data to one or both of the active archive 314 and/or the archiving system 312 to be archived.

Figure 4:
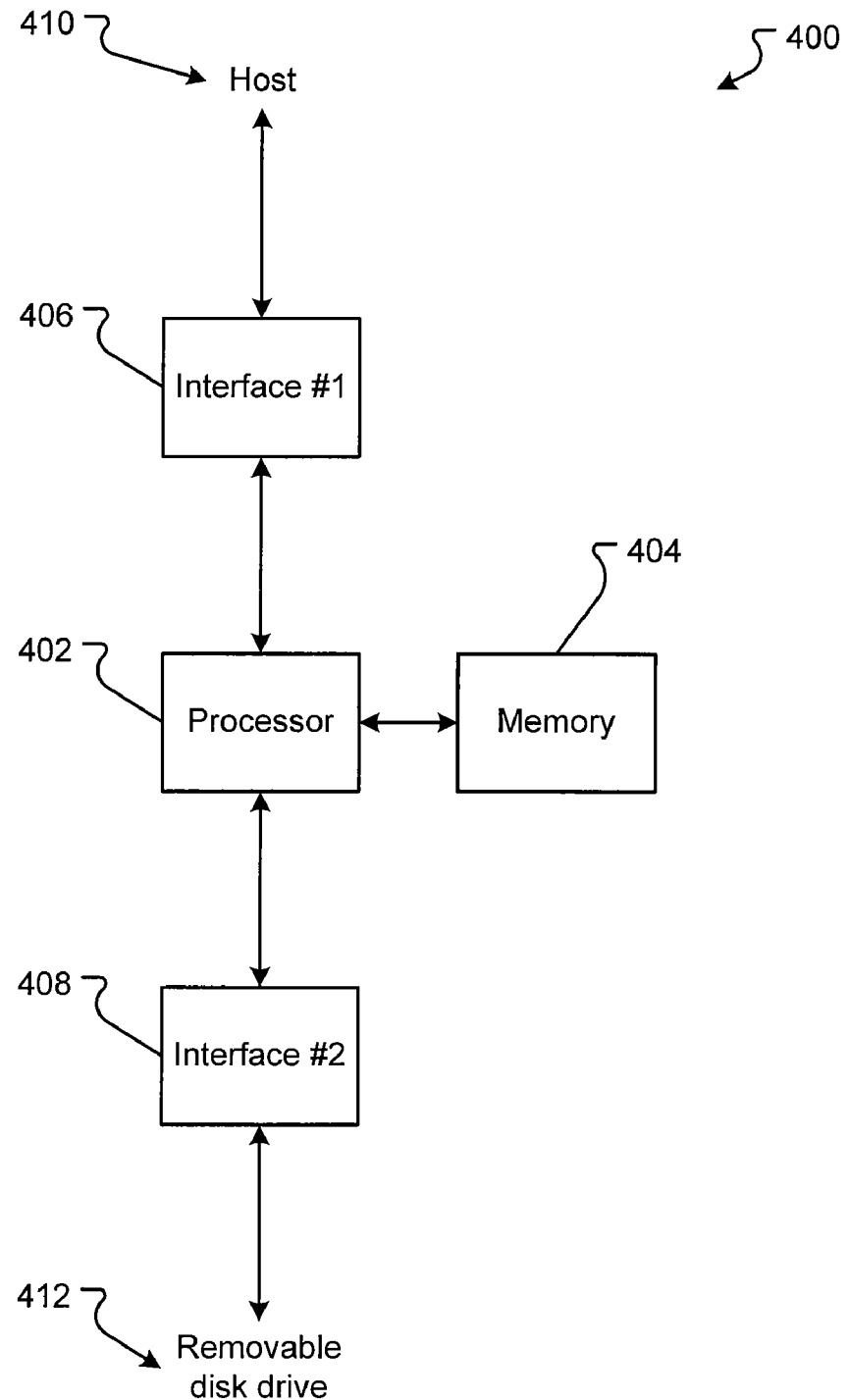
FIG. 4 is a hardware block diagram of an embodiment of a modular drive bay having two or more removable disk drives.

Embodiments of the hardware/firmware 400 of the modular drive bay is shown in FIG. 4. In embodiments, the hardware/firmware 400 is the same or similar to hardware/firmware 116 explained in conjunction with FIG. 1. The hardware/firmware 400, in embodiments, comprises a first interface (interface #1) 406, a processor 402, a memory 404, and a second interface (interface #2) 408. In embodiments, the first interface 406 receives archival data from the host 410 for storage in a removable disk drive 412 and/or sends archived data from the removable disk drive 412 to the host 410. Removable disk drive 412 is, in embodiments, the same or similar to removable disk drive 102 described in conjunction with FIG. 1. The first interface 406 can be any type of interface operable to communicate with the host 410. In embodiments, the host 410 is the archiving system appliance 210 (FIG. 2) and/or archiving system 312 (FIG. 3). The first interface 406 can be a Firewire, USB, SATA, or other interface.

The processor 402 is operable to execute software or firmware stored in memory 404 for storing or retrieving archival data from the removable disk drive 412. The processor 402, in embodiments, is any processor known in the art for executing the functions described herein. For example, the processor 402 is an Intel Pentium, ASIC, FPGA, or other device. The processor 402 interfaces with the first interface 406 to receive archival data for storage and to send data requested from the host 410. The processor 402 further interfaces with the second interface 408 to send data to the removable disk drive 412 and to read data from the removable disk drive 412. The memory 404 may be any type of memory including RAM, ROM, disk drive, etc. The memory 404 may store data or metadata and interfaces with the processor 402.

In embodiments, the second interface 408 retrieves archival data from the removable disk drive to send to the host 410 and sends archival data to the removable disk drive 412 for storage. The second interface 408 can be any type of interface operable to communicate with the removable disk drive 412. The second interface 408 can be a Firewire, USB, SATA, or other interface.

Figure 5:
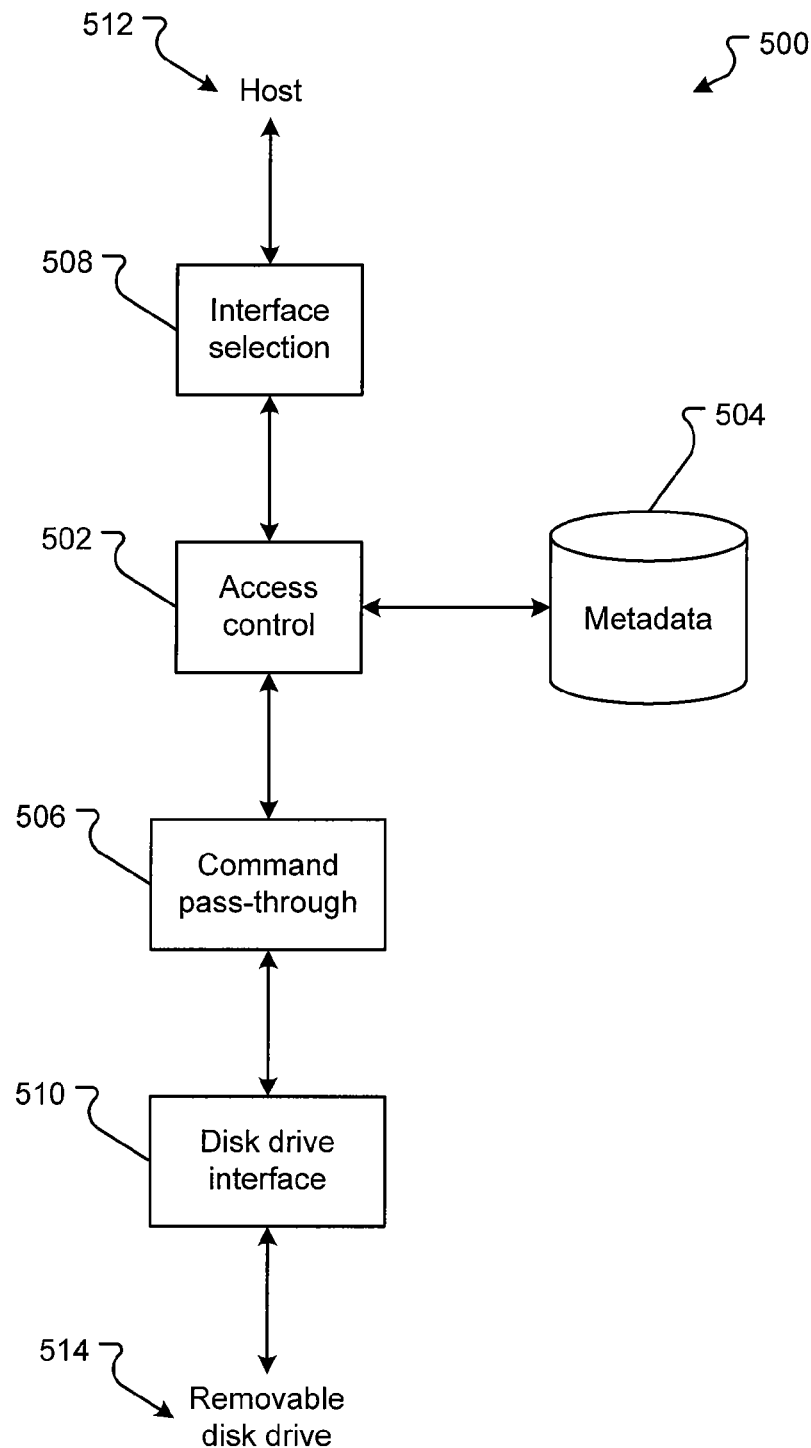
FIG. 5 is a functional block diagram of an embodiment of a modular drive bay.

A functional block diagram of an embodiment of the hardware/firmware 500 of the modular drive bay is shown in FIG. 5. In embodiments, the hardware/firmware 500 is the same or similar to hardware/firmware 116 explained in conjunction with FIG. 1 or hardware/firmware 400 described in conjunction with FIG. 4. In embodiments, the hardware/firmware 500 represents software executed in the hardware/firmware 400 (FIG. 4). The hardware/firmware 500, in embodiments, comprises an interface selection module 508, an access control module 502, a metadata datastore 504, a command pass-through module 506, and/or a disk drive interface 510.

In embodiments, the interface selection module 508 receives requests from the host 512 to store or retrieve archival data. The host 512 may send the requests with a predetermined address for the archival data. The interface selection module 508 can extract the address received from the host 512 to which to store or retrieve the archival data. This address is, in embodiments, provided to the access control module 502.

The access control module 502 is operable to read metadata from the metadata datastore 404. The access control module 502, in embodiments, builds the metadata datastore 404 by reading the metadata from the one or more removable disk drives 514 and storing the metadata in a table or other data structure in the metadata datastore 504. In embodiments, the metadata datastore 504 provides a first available block address to store data in a removable disk drive 514. The first available block address can be used by the access control module 502 to determine where to begin to store data. The access control module 502 can be executed within the processor 402 (FIG. 4).

In embodiments, the command pass-through module 506 sends the commands to the removable disk drive 514. For example, if the request from the host 512 is for a read of data, the command pass-through module 506 executes a read on the removable disk drive 514. The requested command sent from the host 512 may be in one format or comply with one file system. The command pass-through module 506 may change the command to a command understandable by the removable disk drive 514. In further embodiments, the access control module 502 provides the command pass-through module 506 with the first available block address to ensure the command pass-through module 506 stores data at the correct address in the removable disk drive 514.

The disk drive interface 510, in embodiments, is a disk drive driver or other software that allows the command pass-through module 506 to interface with the removable disk drive 514. Thus, the disk drive interface 510 may convert commands for the removable disk drive 514.

Figure 6:
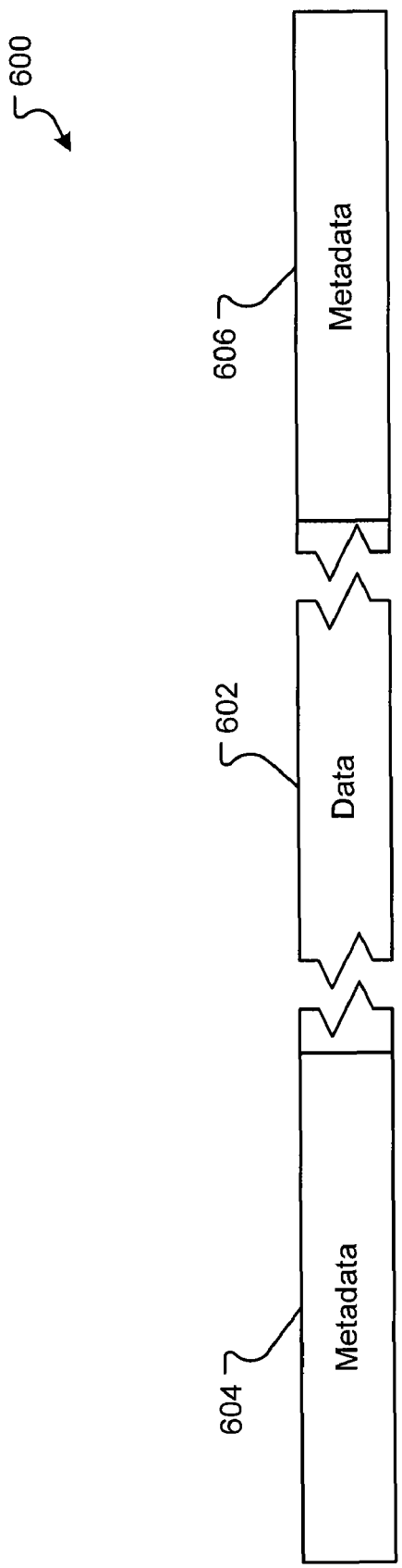
FIG. 6 is a block diagram of an embodiment of information elements stored in a removable disk drive.

An embodiment of an archive 600 stored in a removable disk drive, such as removable disk drive 514, having archival data and one or more portions of metadata is shown in FIG. 6. In embodiments, the archive 600 is a representation of the memory in the removable disk drive. In the example presented in FIG. 6, there is archival data 602 that may have one or more portions that represent files or "information elements" stored in an archive 600. There may be more files than those shown in the exemplary archive 600.

In embodiments, an archive structure 600 may comprise one or more portions of metadata. The metadata 604 and 606, in embodiments, includes the information or attributes about the data 602, for example, the file size, file location, file save date and time, file creation date and time, file creator, etc. File data 602 can include the archived data sent from the application server.

The metadata, in embodiments, is stored in two duplicate regions 604 and 606. A first portion of metadata is stored in a first area 604, while the second portion of metadata, which is a copy of the first portion of metadata, is stored in a second area 606. If the first set of metadata 604 is corrupted, the hardware/firmware 116 (FIG. 1) can fail over to the second set of metadata 606. A more detailed description of the metadata is given in related application entitled "METHODS FOR IMPLEMENTATION OF DATA FORMATS ON A REMOVABLE DISK DRIVE STORAGE SYSTEM", U.S. patent application Ser. No. 12/024,659, filed concurrently with the present application, commonly assigned, and incorporated in its entirety for all it teaches.

Figure 7A:
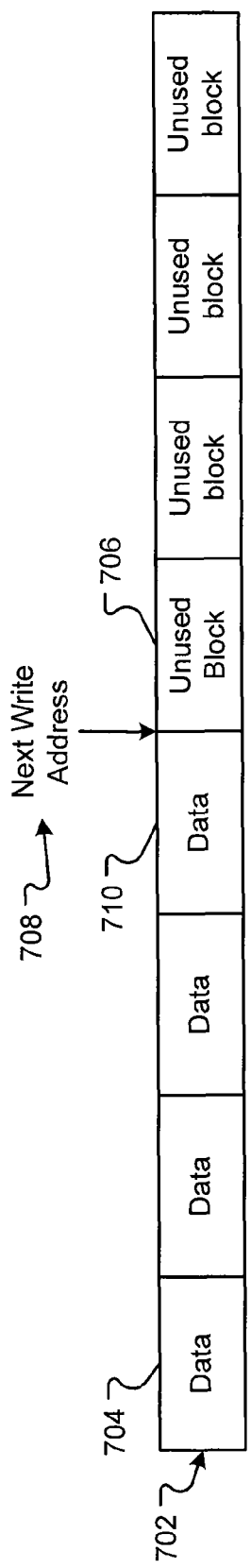
FIGS. 7A-C are other block diagrams of embodiments of information elements stored in a removable disk drive.
Figure 7B:
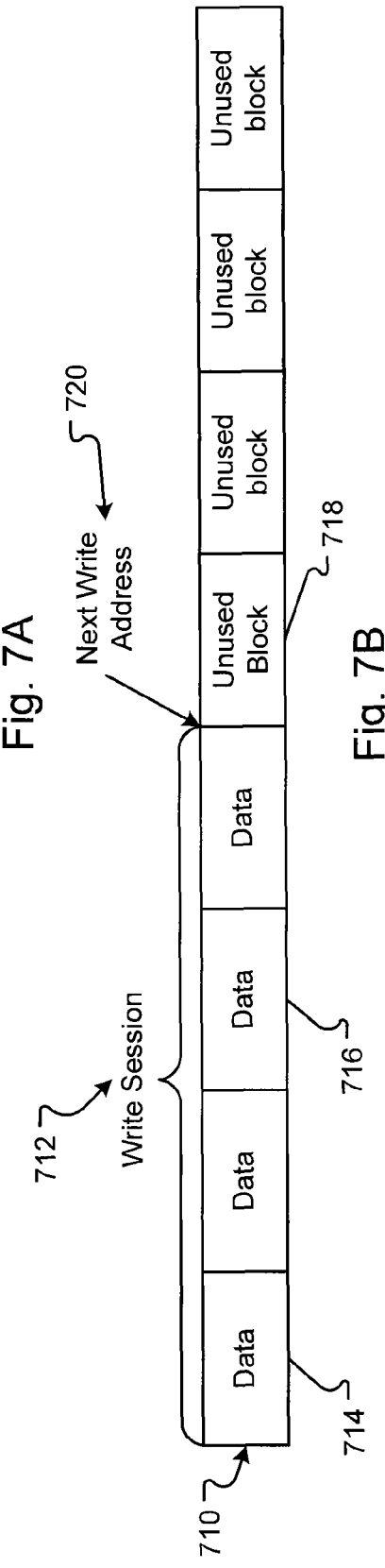
Figure 7C:
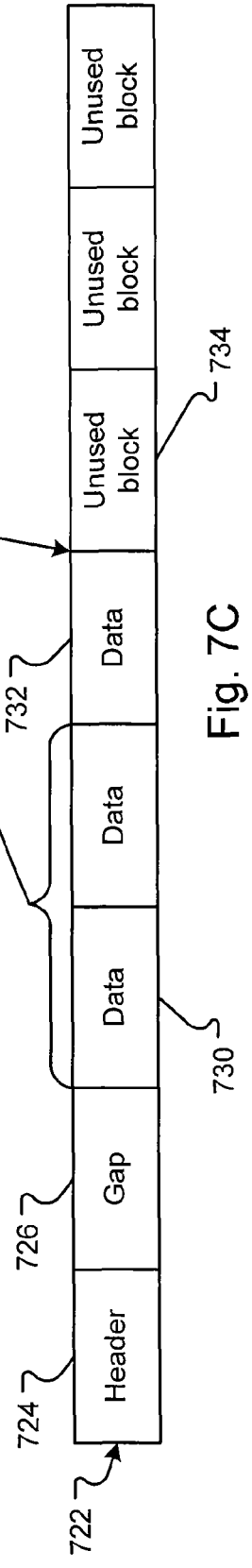

Embodiments of the archived data stored in a removable disk drive is shown in FIGS. 7A-C. The archived data shown in FIGS. 7A-C can represent data 602 described in conjunction with FIG. 6. In embodiments, the archived data is protected by a write once read many (WORM) enforcement policy. As such, data in the removable disk drive cannot be overwritten. In the example presented in FIGS. 7A-C, the archival data may be stored in one or more logical blocks as understood in the art. One or more logical block may represent files or "information elements" stored in an archive. There may be more files or logical blocks than those shown in the exemplary archives in FIGS. 7A-C.

A first archival data archive 702 is shown in FIG. 7A. In embodiments, archival data is stored to the archive 702 as the data is received. As such, data blocks may be stored in order from a first data block 704 to a last data block 710. To ensure the data is immutable and under WORM protection, no data could be written to an address that was already used to store data. A pointer 708, in embodiments, is maintained to represent where the next unused block 706 is where new data could be stored. The pointer 708 may be stored in metadata 604 (FIG. 6). The pointer 708 is incremented to the next unused block as data is stored. As changes to data that has already been stored is received, the changed data is stored to the unused block 706.

Another embodiment of an archive 710 storing immutable archival data is shown in FIG. 7B. The archive 710, in embodiments, is created by writing data in sessions. As such, archival data may be received and queued. Then, in one or more writes, the queued data could be stored to the archive 710 in the same or a different order than how the archival data was received. For example, four data blocks may be written in a single session represented by bracket 712. In embodiments, a session may write more or fewer data blocks that those shown in FIG. 7B. The data stored in the session write 712 may have been reordered from the way the data was received. For example, data block 714 is received after data block 716 but stored to the archive 710 before data block 716. As such, associated data blocks, i.e., data blocks comprising a single file, are, in embodiments, written together. As with archive 702, a pointer 720 is written after the session write that represents the next unused block of memory 718 available for the next write session. Again, as changes to data that has already been stored is received, the changed data is stored to the unused block 718 in a new session write.

Still another embodiment of an archive 722 storing immutable archival data is shown in FIG. 7C. In embodiments, the archival data in the archive 722 is stored in a session where new data is stored with a header 724, a gap 726 and one or more blocks of data 728. The header 724 may include one or more items of metadata related to the data 728. For example, the header 724 includes an identifier for the data. The header 724, once written, is also immutable and cannot be overwritten. The gap 726 provides an area of data that can be overwritten. The gap 726, in embodiments, provides the address for the data 728 associated with the header 724. The header 724 may then provide a pointer to the gap 726 that would then provide a pointer to the data 728. As such, when data is changed and restored to the archive 722, the pointer in the gap 726 is rewritten for the new location. The old data remains but reads are redirected to the new location. For example, data block 732 may be an update to data in 730. Once data block 732 is written, the pointer in the gap 726 is rewritten to point to data block 732 instead of block 730. If a new block 734 is then changed, the gap 726 could be rewritten again to point to data block 734. Again, the next write is to the first unused data block 734 represented by pointer 736.

Figure 8:
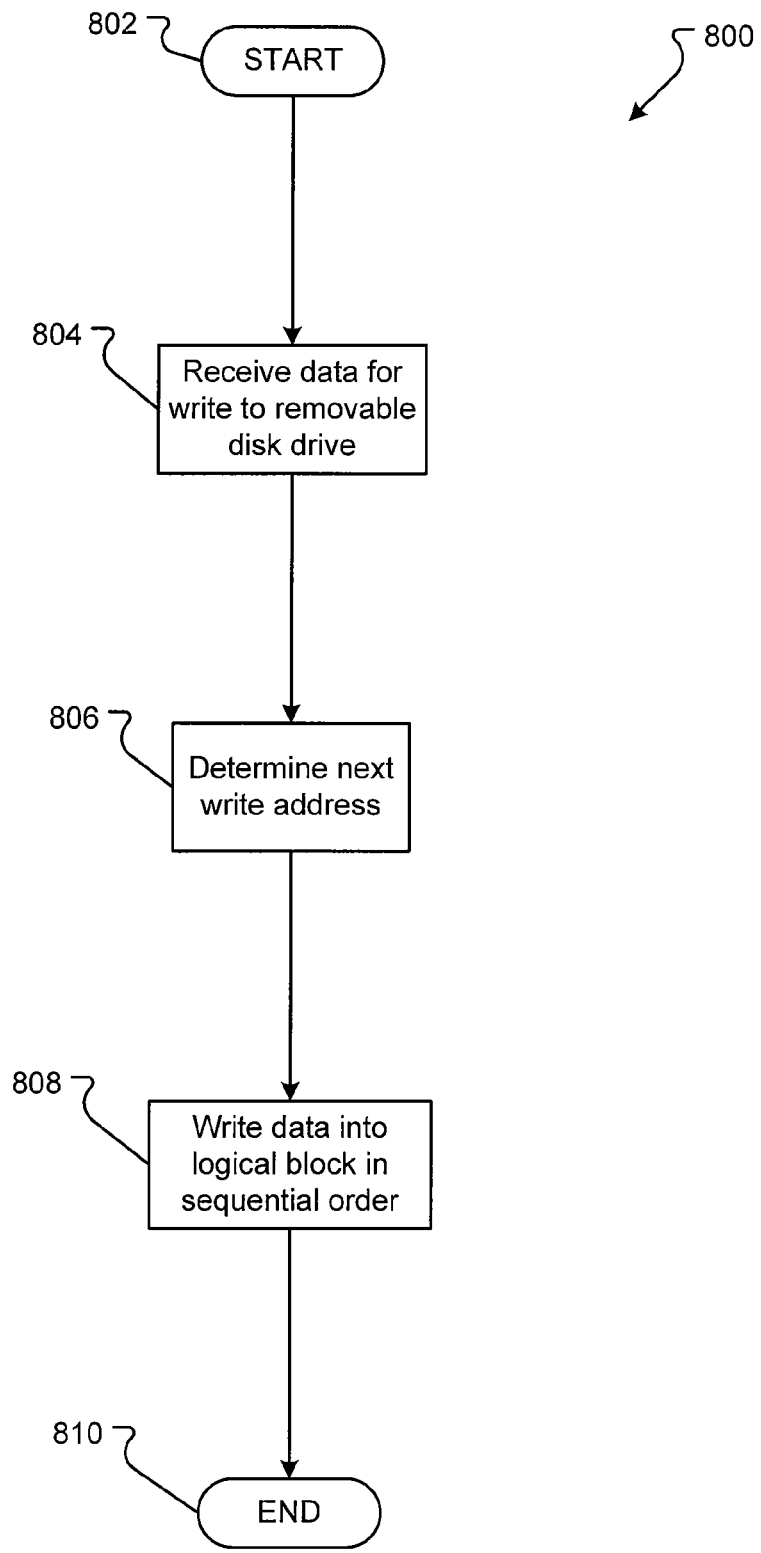
FIG. 8 is a flow diagram of an embodiment of a method for storing data on a removable disk drive.

An embodiment of a method 800 for storing data in an archive and protecting the data as immutable is shown in FIG. 8. In embodiments, the method 800 generally begins with a START operation 802 and terminates with an END operation 810. The steps shown in the method 800 may be executed in a computer system as a set of computer executable instructions. While a logical order is shown in FIG. 8, the steps shown or described can, in some circumstances, be executed in a different order than presented herein. The method 800, in embodiments, relates to archive 702 described in conjunction with FIG. 7A.

Receive operation 804 receives archival data to write to the archive 702 (FIG. 7A) in the removable disk drive 102 (FIG. 1). In embodiments, the interface selection module 508 (FIG. 5) receives the archival data from the host 512 (FIG. 5) in a set of sequential data blocks. The interface selection module 508 (FIG. 5) can queue the data in a first in first out (FIFO) memory.

Determine operation 806 determines the next write address. In embodiments, the access control module 502 (FIG. 5) reads the metadata 604 (FIG. 6) from the removable disk drive 102 (FIG. 1). The access control module 502 (FIG. 5) can create a metadata table or other data structure in the metadata datastore 504 (FIG. 5) stored in memory 404 (FIG. 4). Further, the access control module 502 (FIG. 5), in embodiments, reads the pointer 708 (FIG. 7A). This pointer 708 (FIG. 7A) can be used to determine the address for the data for storage in the removable disk drive 102 (FIG. 1).

Write operation 808 writes data starting at the address represented by the pointer 708 (FIG. 7A). In embodiments, the access control module 502 (FIG. 5) sends the address represented by the pointer 708 (FIG. 7A) to the command pass-through module 506 (FIG. 5). The command pass-through 506 (FIG. 5) generates a command signal with the address and sends the write command to the disk drive interface 510 (FIG. 5) for communication through the second interface 408 (FIG. 4) to the removable disk drive 102 (FIG. 1). The write, in embodiments, is completed on the queued data in a sequential write starting at the pointer address. Each data block is written to each successive available memory block in the order the data blocks were received. In embodiments, the access control module 502 (FIG. 5), either during the write or after the write, creates a new pointer and stores the new pointer in the metadata 604 (FIG. 6) on the removable disk drive 102 (FIG. 1).

Figure 9:
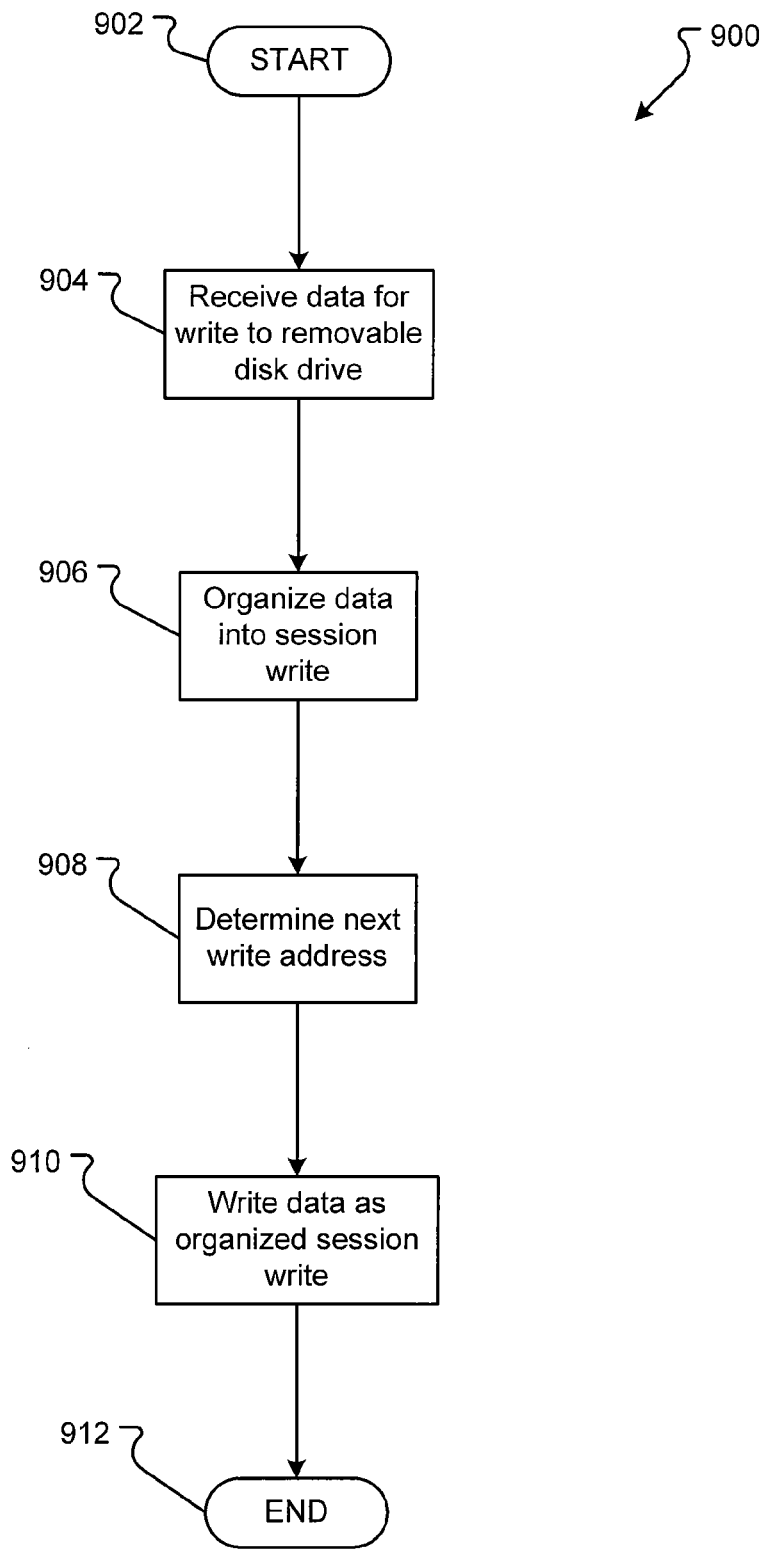
FIG. 9 is another flow diagram of an embodiment of a method for storing data on a removable disk drive.

Another embodiment of a method 900 for storing data in an archive and protecting the data as immutable is shown in FIG. 9. In embodiments, the method 900 generally begins with a START operation 902 and terminates with an END operation 912. The steps shown in the method 900 may be executed in a computer system as a set of computer executable instructions. While a logical order is shown in FIG. 9, the steps shown or described can, in some circumstances, be executed in a different order than presented herein. The method 900, in embodiments, relates to archive 710 described in conjunction with FIG. 7B.

Receive operation 904 receives archival data to write to the archive 710 (FIG. 7B) in the removable disk drive 102 (FIG. 1). In embodiments, the interface selection module 508 (FIG. 5) receives the archival data from the host 512 (FIG. 5) in a set of sequential data blocks. The interface selection module 508 (FIG. 5) can queue the data in a FIFO memory.

Organize operation 906 organizes the data into a session write. The access control module 502 (FIG. 5), in embodiments, reads the data from the queue and reorganizes the data into a set of data blocks for a session write. In embodiments, the data is organized to place associated data together, for example, data associated with the same file is grouped together. The organized data may be stored again into a queue before being written to the removable disk drive 102 (FIG. 1).

Determine operation 908 determines the next write address. In embodiments, the access control module 502 (FIG. 5) reads the metadata 604 (FIG. 6) from the removable disk drive 102 (FIG. 1). The access control module 502 (FIG. 5) can create a metadata table or other data structure in the metadata datastore 504 (FIG. 5) stored in memory 404 (FIG. 4). Further, the access control module 502 (FIG. 5), in embodiments, reads the pointer 720 (FIG. 7B). This pointer 720 (FIG. 7B) can be used to determine the address for the data for storage in the removable disk drive 102 (FIG. 1).

Write operation 910 writes data starting at the address represented by the pointer 720 (FIG. 7B). In embodiments, the access control module 502 (FIG. 5) sends the address represented by the pointer to the command pass-through module 506 (FIG. 5). The command pass-through 506 (FIG. 5) generates a command signal with the address and sends the write command to the disk drive interface 510 (FIG. 5) for communication through the second interface 408 (FIG. 4) to the removable disk drive 102 (FIG. 1). The write, in embodiments, is completed as a session with the organized data blocks all being written in one session in the order the data blocks were organized. In embodiments, the access control module 502 (FIG. 5), during or after the write session, creates a new pointer and stores the new pointer in the metadata 604 (FIG. 6) on the removable disk drive 102 (FIG. 1).

Figure 10:
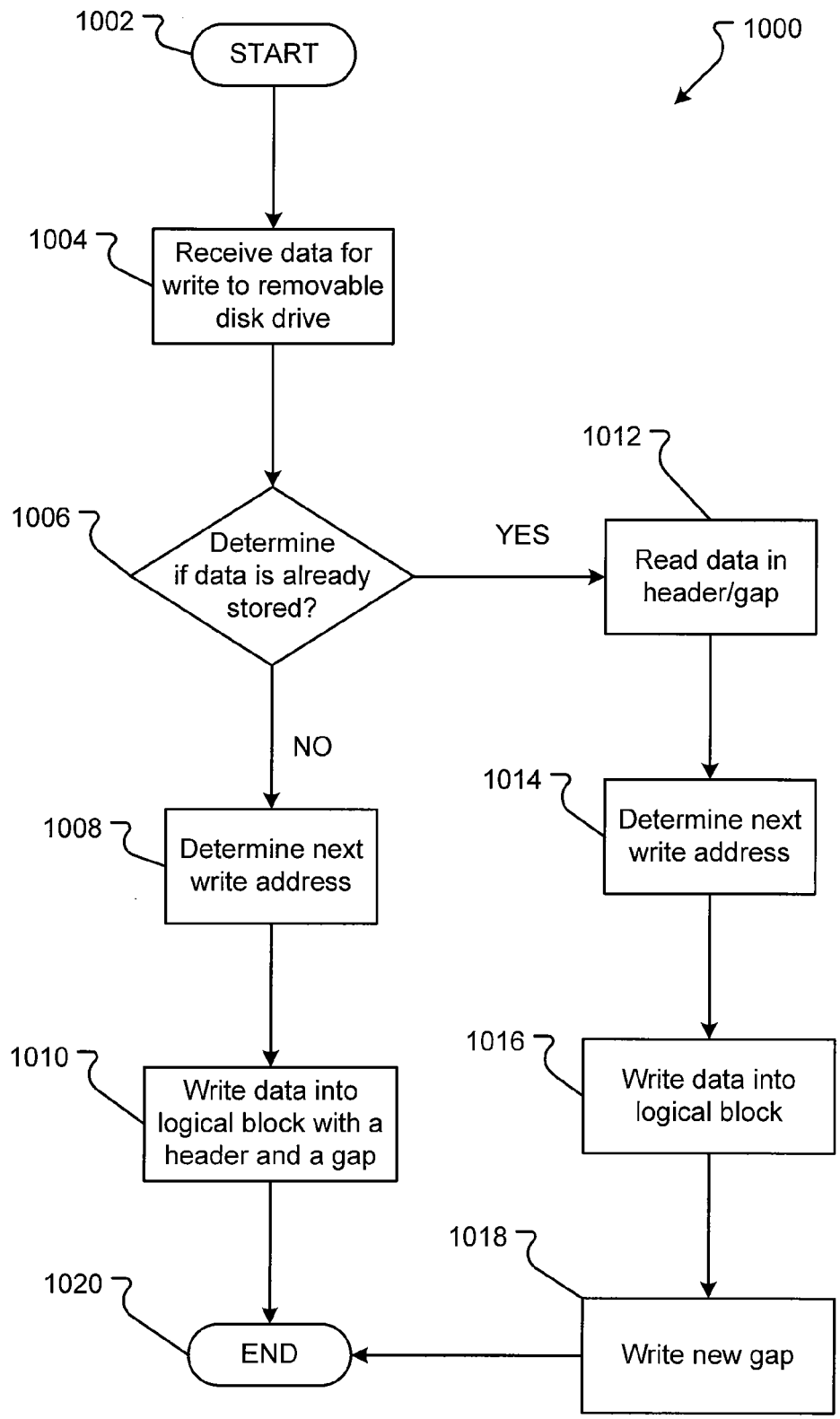
FIG. 10 is yet another flow diagram of an embodiment of a method for storing data on a removable disk drive.

Another embodiment of a method 1000 for storing data in an archive and protecting the data as immutable is shown in FIG. 10. In embodiments, the method 1000 generally begins with a START operation 1002 and terminates with an END operation 1020. The steps shown in the method 1000 may be executed in a computer system as a set of computer executable instructions. While a logical order is shown in FIG. 10, the steps shown or described can, in some circumstances, be executed in a different order than presented herein. The method 1000, in embodiments, relates to archive 722 described in conjunction with FIG. 7C.

Receive operation 1004 receives archival data to write to the archive 722 (FIG. 7C) in the removable disk drive 102 (FIG. 1). In embodiments, the interface selection module 508 (FIG. 5) receives the archival data from the host 512 (FIG. 5) in a set of sequential data blocks. The interface selection module 508 (FIG. 5) can queue the data in a FIFO memory.

Determine operation 1006 determines if one or more data blocks received are associated with data already stored in the archive 722 (FIG. 7C). In embodiments, the access control module 502 (FIG. 5) reads the metadata 604 (FIG. 6) from the removable disk drive 102 (FIG. 1). The access control module 502 (FIG. 5) can create a metadata table or other data structure in the metadata datastore 504 (FIG. 5) stored in memory 404 (FIG. 4). Further, the access control module 502 (FIG. 5), in embodiments, reads the header(s) 724 (FIG. 7C) to determine if an identifier received from the host 410 (FIG. 4) for the file or data is the same as an identifier currently in a header 724 (FIG. 7C). If an identifier is the same, the method 1000 flows YES to read operation 1012. If the identifier is not the same, the method 1000 flows NO to determine operation 1008. In embodiments, the method 1000 may flow YES for some data and flow NO for other data.

Determine operation 1008 determines the next write address. In embodiments, the access control module 502 (FIG. 5) reads the metadata 604 (FIG. 6) stored in memory 404 (FIG. 4). The access control module 502 (FIG. 5), in embodiments, reads the pointer 736 (FIG. 7C). This pointer 736 (FIG. 7C) can be used to determine the address for the data for storage in the removable disk drive 102 (FIG. 1).

Write operation 1010 writes data starting at the address represented by the pointer 736 (FIG. 7C). In embodiments, the access control module 502 (FIG. 5) sends the address represented by the pointer to the command pass-through module 506 (FIG. 5). The command pass-through 506 (FIG. 5) generates a command signal with the address and sends the write command to the disk drive interface 510 (FIG. 5) for communication through the second interface 408 (FIG. 4) to the removable disk drive 102 (FIG. 1). The write, in embodiments, is completed as a session with the organized data blocks all being written in one session in the order the data blocks were organized. In embodiments, the access control module 502 (FIG. 5) also writes a header 724 (FIG. 7C) that can include metadata and also creates a gap 726 (FIG. 7C) in which the address of the new data is stored.

Read operation 1012 reads the header 724 (FIG. 7C) and gap 726 (FIG. 7C) information to determine the address of the existing data. As explained in conjunction with FIG. 7C, the gap 726 is a writable and rewritable area that includes the address for the data associated with the header 724 (FIG. 7C). The gap 726 (FIG. 7C) can be overwritten when updates to the data are stored.

Determine operation 1014 determines the next write address. In embodiments, the access control module 502 (FIG. 5) reads the metadata 604 (FIG. 6) stored in memory 404 (FIG. 4). The access control module 502 (FIG. 5), in embodiments, reads the pointer 736 (FIG. 7C). This pointer 736 (FIG. 7C) can be used to determine the address for the data for storage in the removable disk drive 102 (FIG. 1).

Write operation 1016 writes data starting at the address represented by the pointer 736 (FIG. 7C). In embodiments, the access control module 502 (FIG. 5) sends the address represented by the pointer to the command pass-through module 506 (FIG. 5). The command pass-through 506 (FIG. 5) generates a command signal with the address and sends the write command to the disk drive interface 510 (FIG. 5) for communication through the second interface 408 (FIG. 4) to the removable disk drive 102 (FIG. 1). The write, in embodiments, is completed as a session with the organized data blocks all being written in one session in the order the data blocks were organized.

Write operation 1018 writes a new gap. In embodiments, the access control module 502 (FIG. 5) also rewrites the gap 726 (FIG. 7C) to include the new address for the changed data. As such, read requests recover the most recently stored data.

In light of the above description, a number of advantages of the present disclosure are readily apparent. For example, the data stored on a removable disk drive may be stored with WORM protection yet be stored on a random access media. The systems and methods presented keep the data immutable and provide protection at the hardware/firmware level of the modular drive bay or drive port. Thus, the host or other systems have no control over the WORM protection and cannot change the protection once set.

A number of variations and modifications can also be used. For example, the gap may be a single rewritable area where all addresses of all data are stored. This larger table may be a look-up table or other data structure for storage of data addresses. The headers could point to an area in the look-up table and successive data storages could create links to the most recently stored data.

While the principles of the disclosure have been described above in connection with specific apparatuses and methods, it is to be clearly understood that this description is made only by way of example and not as limitation on the scope of the disclosure.

What is claimed is:

1. A modular drive bay in a network storage system for archiving data, the modular drive bay comprising:
    one or more removable disk drives, the one or more removable disk drives operable to store archival data, the one or more removable disk drives operable to maintain data as immutable with Write Once, Read Many (WORM) controls, each removable disk drive comprising:
        a data cartridge case;
        a connector; and an embedded memory, the embedded memory physically attached to the data cartridge case and electrically connected to the connector, the embedded memory comprising:

one or more memory blocks operable for storing immutable archival data;

one or more headers, each header storing one or more items of metadata associated with the one or more memory blocks; and one or more gaps, each gap comprising:

a re-writable block of data between one of the one or more headers and one of the one or more memory blocks; and one or more address of the one or more memory blocks; and a modular drive bay, the modular drive bay comprising:

two or more drive ports, each drive port including a data cartridge connector which mates with the connector to communicate with the embedded memory; and a hardware/firmware, the hardware/firmware in communication with one or more application servers, the hardware/firmware receiving write requests associated with archival data from the one or more application servers, the hardware/firmware operable to store the archival data to one or more unused memory blocks in the embedded memory without overwriting existing data.

2. The modular drive bay as defined in claim 1, wherein the hardware/firmware comprises:

a first interface, the first interface operable to receive the write request from the host;

a second interface, the second interface operable to send the write request to the one or more removable disk drives at an address for a first unused memory block;

a memory, the memory operable to store one or more items of metadata, at least one item of metadata providing a pointer to the first unused memory block; and a processor in communication with the first interface, the second interface, and the memory, the processor operable to read the pointer and to generate the write command sent to the one or more removable disk drives with the address for the first unused memory block.

3. The modular drive bay as defined in claim 2, wherein the processor includes executable software modules, the software modules comprising:

an interface selection module, the interface selection module receiving the write request;

a metadata datastore, the metadata datastore storing one or more items of metadata read from the one or more removable disk drives, the metadata including the pointer; and an access control module in communication with the interface selection module and the metadata datastore, the access control module receiving the write request, the access control module determining the address associated with the pointer for the first unused data block, the access control module generating a write command addressed to the address associated with the pointer.

4. The modular drive bay as defined in claim 3, further comprising a command pass-through module in communication with the access control module, the command pass-through module receiving the address and executing the write request at the address.

5. The modular drive bay as defined in claim 4, wherein the command pass-through module is operable to write two or more data blocks to the embedded memory and wherein the command pass-through writes the two or more data blocks sequentially in an order received by the interface selection module.

6. The modular drive bay as defined in claim 4, wherein the command pass-through module is operable to write two or more data blocks to the embedded memory, wherein the access control module is operable to reorganize the two or more data blocks by the interface selection module, and wherein the command pass-through module is operable to write the reorganized data blocks in an order provided by the access control module in a session write.

7. The modular drive bay as defined in claim 4, wherein the command pass-through module is operable to write two or more data blocks to the embedded memory, wherein the access control module is operable to determine if one or more of the data blocks received is an update to one or more data blocks already stored in the embedded memory and wherein, if one or more of the data blocks are an update, the command pass-through module is operable to write the updated data blocks to one or more unused memory blocks in the embedded memory and to update an address for the updated data blocks stored in a gap.

8. The modular drive bay as defined in claim 2, wherein the network storage system cannot access the hardware/firmware that controls writing of the one or more data blocks.

9. An archive in an embedded memory of a removable disk drive of an archiving system, the embedded memory storing immutable data under Write Once, Read Many (WORM) control, the archive comprising:

one or more data blocks, the one or more data blocks comprising data stored in the embedded memory, the one or more data blocks providing data to the archiving system if accessed by random access and read, the one or more data blocks containing immutable data;

one or more unused memory blocks, the one or more unused memory blocks accepting archival data when written to by the archiving system;

one or more headers, each header storing one or more items of metadata associated with the one or more data blocks;

one or more gaps, each gap comprising:

a re-writable block of data between one of the one or more headers and one of the one or more data blocks; and one or more address of the one or more data blocks; and a pointer, the pointer associated with an address of the first unused memory block that can accept archival data, the pointer preventing the archiving system from writing to the one or more data blocks that precede the pointer.

10. The archive as defined in claim 9, wherein the one or more data blocks are written in sequential order in an order received by the archiving system and wherein the pointer is updated after each data block is written.

11. The archive as defined in claim 9, wherein one or more data blocks are reorganized by the archiving system and stored in a write session and wherein the pointer is updated after the write session.

12. The archive as defined in claim 9, wherein at least one gap of the one or more gaps is updated if an update to the one or more data blocks is written to the one or more unused memory blocks.

13. The archive as defined in claim 9, wherein one of the one or more gaps precedes the pointer but is rewritable.

14. A method, executable in a computer system, for protecting immutable data in an embedded memory of a removable disk drive, the method comprising:

receiving a write request for one or more data blocks;

determining a next write address by reading a pointer in metadata associated with a first unused memory block in the embedded memory;

writing to one or more unused memory blocks that follow the pointer;

determining if the write request corresponds to an update of one or more data blocks already stored in the embedded memory;

if the write request corresponds to an update of the one or more data blocks already stored in the embedded memory, updating an address in a gap with an address indicating a location where the one or more updated data blocks were written, wherein the gap comprises a re-writable block of data between a header and the one or more data blocks already stored in the embedded memory;

if the write request does not correspond to an update of the one or more data blocks already stored in the embedded memory, creating a header associated with the one or more data blocks;

creating a gap storing an address for the one or more data blocks.

15. The method as defined in claim 14, wherein the one or more data blocks are written sequentially in an order received with the write request.

16. The method as defined in claim 14, further comprising: organizing the one or more data blocks received; and wherein the organized one or more data blocks are written in a session write to the one or more unused memory blocks.

17. The method as defined in claim 14, wherein the gap precedes the pointer and is rewritable.

18. The method as defined in claim 17, wherein the header precedes the pointer but is not rewritable.

* * * * *